(12) United States Patent
Ventikos et al.

(10) Patent No.: US 9,984,775 B2
(45) Date of Patent: May 29, 2018

(54) LOCALISED ENERGY CONCENTRATION

(71) Applicant: Isis Innovation Limited, Oxford (GB)

(72) Inventors: Yiannis Ventikos, Oxford (GB);
Nicholas Hawker, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 323 days.

(21) Appl. No.: 14/772,984

(22) PCT Filed: Mar. 6, 2014

(86) PCT No.: PCT/GB2014/050663
§ 371 (c)(1),
(2) Date: Sep. 4, 2015

(87) PCT Pub. No.: WO2014/135881
PCT Pub. Date: Sep. 12, 2014

(65) Prior Publication Data
US 2016/0012921 A1   Jan. 14, 2016

(30) Foreign Application Priority Data
Mar. 6, 2013 (GB) .................................. 1304046.4

(51) Int. Cl.
*G10K 15/04* (2006.01)
*G21B 3/00* (2006.01)
*F15B 21/12* (2006.01)

(52) U.S. Cl.
CPC ........... *G21B 3/006* (2013.01); *G10K 15/043* (2013.01); *F15B 21/12* (2013.01)

(58) Field of Classification Search
CPC .......... G21B 3/00; G21B 3/006; G21B 3/008; G10K 15/043
(Continued)

(56) References Cited

U.S. PATENT DOCUMENTS 3,417,829 A   12/1968 Acheson et al.
3,624,239 A   11/1971 Fraas
(Continued)

FOREIGN PATENT DOCUMENTS

CN   1603772 A   4/2005
CN   102759439 A   10/2012
(Continued)

OTHER PUBLICATIONS

Examiner's Appendix: LENR Sonoluminscence.*
(Continued)

*Primary Examiner* — Sharon M Davis
(74) *Attorney, Agent, or Firm* — Cantor Colburn LLP

(57) ABSTRACT

A method of producing a localized concentration of energy includes: creating a shockwave propagating through a non-gaseous medium so as to be incident upon a boundary between the non-gaseous medium and a gaseous medium formed by at least one hole in a barrier separating the non-gaseous medium from a gaseous medium. This forms a transverse jet on the other side of the hole which is incident upon a target surface comprising a depression which is spaced from the barrier in the gaseous medium. An apparatus for producing a localized concentration of energy is also described.

26 Claims, 7 Drawing Sheets

(58) Field of Classification Search
USPC .................................... 376/100, 102, 149
See application file for complete search history.

(56) References Cited

U.S. PATENT DOCUMENTS

| | | | |
|---|---|---|---|
| 3,953,617 | A | 4/1976 | Smith et al. |
| 4,333,796 | A | 6/1982 | Flynn |
| 7,380,918 | B2 | 6/2008 | Dean, Jr. et al. |
| 7,445,319 | B2 | 11/2008 | Dean, Jr. et al. |
| 2003/0215046 | A1 | 11/2003 | Hornkohl |
| 2008/0037694 | A1 | 2/2008 | Dean, Jr. et al. |
| 2010/0124142 | A1 | 5/2010 | Laugharn, Jr. et al. |
| 2011/0228890 | A1 | 9/2011 | Dearn, Jr. et al. |
| 2012/0281797 | A1 | 11/2012 | Ventikos et al. |
| 2012/0288047 | A1 | 11/2012 | Ventikos et al. |
| 2013/0114774 | A1 | 5/2013 | Ventikos et al. |
| 2015/0139378 | A1 | 5/2015 | Hawker et al. |
| 2016/0019984 | A1 | 1/2016 | Ventikos et al. |

FOREIGN PATENT DOCUMENTS

| | | |
|---|---|---|
| JP | H04158200 | 6/1992 |
| JP | H06198496 | 7/1994 |
| JP | 2001193381 | 7/2001 |
| WO | 02097823 A1 | 12/2002 |
| WO | 03034441 A1 | 4/2003 |
| WO | 2011064592 A1 | 6/2011 |
| WO | 2011064594 A2 | 6/2011 |
| WO | 2011138622 A1 | 11/2011 |

OTHER PUBLICATIONS

"Report of the Investigation Committee In the Matter of Dr. Rusi P. Taleyarkhan." http://news.uns.purdue.edu/x/2008b/080718PurdueReport.pdf last accessed Sep. 27, 2012.
Barbaglia et al.; "Search of Fusion Reactions During the Cavitation of a Single Bubble in Deuterated Liquids"; Physica Scripts, vol. 72; 2005; pp. 75-78.
Bourne et al.; "Shock-Induced Collpase and Luminescence by Cavities"; Philosophical Transactions of the Royal Society London, Series A, vol. 357, No. 1751; 1999; pp. 295-311.
Bourne et al.; "The temperature of a shock-collapsed cavity"; Proceedings of the Royal Society London, Series A, No. 459; 2003, pp. 1851-1861.
Brenner et al.; "Single-bubble sonoluminescence"; Rev. Mod. Phys. vol. 74, No. 2; Apr. 2002; p. 425-484.
Brujan et al.; "Properties of luminescence from laser-created bubbles in pressurized water"; The American Physical Society, vol. 72, No. 6; Dec. 21, 2005; pp. 066310-1-066310-6.
Brunton; "High speed liquid impact"; Royal Society of London Philosophical Transactions Mathematical, Physical and Engineering Sciences, The Royal Society, vol. 260; Jul. 28, 1966; pp. 79-85.
Dear et al.; "High-speed photography of surface geometry effects in liquid/solid impact"; Journal of Applied Physics, vol. 63, No. 4; Feb. 15, 1988; pp. 1015-1021; XP002633349.
Decorso et al.; "Erosion by Liquid Impact"; ASTM International; 1962; p. 41.
Ed. "Bubble fusion: silencing the hype," Mar. 8, 2006 doi: 10.1038/news060306-1 last accessed Sep. 27, 2006, arXiv:physics/0603060v2 last accessed Sep. 27, 2012.
Gaitan et al.; "Sonoluminescence and Bubble Dynamics for a Single, Stable, Cavitation Bubble"; Journal Acoustical Society of America, vol. 91, No. 6; Jun. 1992; pp. 3166-3183.
Gaitan et al.; "Transient cavitation in high-quality-factor resonators at high static pressures"; Journal of the Acoustical Society of America, vol. 127, No. 6; Jun. 2010; pp. 3456-3465; XP002715356.
Galonsky; "Tabletop Fusion Revisted"; Science, vol. 297; Sep. 6, 2002; pp. 1645-1647.
Great Britain Office Action for Great Britain Application No. 1208939.7; dated Sep. 24, 2012; 3 pages.

Haller et al.; "Computational Study of High-Speed Liquid Droplet Impact"; Journal of Applied Physics, vol. 92, No. 5; Sep. 1, 2002; pp. 2821-2828.
Haller et al.; "Wave structure in the contact line region during high speed droplet impact on a surface: Solution of the Riemann problem for the stiffened gas equation of state"; Journal of Applied Physics, vol. 93, No. 5; Mar. 1, 2003; pp. 3090-3097.
Hawker et al.; "Interaction of a Strong Shockwave with a Gas Bubble in a Liquid Medium: a Numerical Study"; J. Fluid Mech., vol. 701; 2012; pp. 59-97.
Hawker et al.; "Shock/Gas Bubble Interactions in Infinite and Finite Volumes of Liquid", 2nd Micro and Nano Flows Confernece, Department of Engineering Science, University of Oxford, Sep. 1-2, 2009, pp. 1-5, West London UK.
International Search Report and Written Opinion for International Application No. PCT/GB2010/051974; International Filing Date Nov. 26, 2010; dated Apr. 28, 2011; pp. 1-11.
International Search Report and Written Opinion for International Application No. PCT/GB2010/051976; International Filing Date Nov. 26, 2010; dated Jun. 9, 2011; pp. 1-11.
International Search Report and Written Opinion for International Application No. PCT/GB2011/05088; International Filing Date May 9, 2011; dated Sep. 16, 2011; pp. 1-12.
International Search Report and Written Opinion for International Application No. PCT/GB2013/051297; International Filing Date May 20, 2013; dated Nov. 20, 2013; pp. 1-11.
International Search Report for International Application No. PCT/GB2014/050661, International Filing Date Mar. 6, 2014, dated Jul. 4, 2014, 5 pages.
International Search Report for International Application No. PCT/GB2014/050663, International Filing Date Mar. 6, 2014, dated Jul. 4, 2014, 5 pages.
Japan Office Action for Japanese Patent Application No. 2012-540500, OA transmission dated Apr. 28, 2015, 2 pages, non-English Translation.
Japan Office Action for Japanese Patent Application No. 2012-540500, OA transmission dated Apr. 28, 2015, 3 pages, English Translation.
Japan Office Action for Japanese Patent Application No. 2013-508557, OA Transmission dated Mar. 10, 2015, 5 pages, non-English Translation.
Japan Office Action for Japanese Patent Application No. 2013-508557, OA Transmission dated Mar. 10, 2015, 9 pages, English Translation.
Johnsen et al.; "Numerical simulations of non-spherical bubble collapse"; Journal of Fluid Mechanics, vol. 629; Jun. 25, 2009; pp. 231-262; XP002715357.
Johnsen et al.; "Shock-Induced Collapse of a Gas Bubble in Shockwave Lithotripsy"; J. Acoustical Society of America, vol. 124, No. 4; Oct. 2008; pp. 2011-2020.
Kroninger et al.; "Particle tracking velocimetry of the flow field around a collapsing cavitation bubble"; Exp Fluids, vol. 48, 2010; pp. 395-408.
Lauer et al.; "Numerical Investigation of Collapsing Cavity Arrays"; Physics of Fluids, vol. 24; 2012; pp. 1-24.
Lauterborn et al.; "News from bubble dynamics: high static pressures, shock waves and interior dynamics"; The 19th International Symposium on Nonlinear Acoustics; 2012; 1 page.
Matthujak et al.; "High Speed Jet Formation by Impact Acceleration Method"; Shock Waves, vol. 16; 2007; pp. 405-419.
Naranjo; "Comment on Nuclear Emissions During Self-Nucleated Acoustic Cavitation", Sep. 12, 2006 arxiv: physics/0603060v2 last accessed Sep. 27, 2012.
Peplow; "Desktop Fusion is Back on the Table," Jan. 10, 2006, doi:10.1038/news060109-5 last accessed Sep. 27, 2012.
Philipp et al.; "Cavitation erosion by single laser-produced bubbles"; J. Fluid Mech., vol. 361; 1998; pp. 75-116.
Plesset et al.; "Bubble Dynamics and Cavitation"; Annual Review Fluid Mech., vol. 9; 1977; pp. 145-185.
Range et al.; "Influence of surface roughness on liquid drop impact"; Journal of Colloid and Interface Science, vol. 203; 1998; pp. 16-30.

(56) References Cited

OTHER PUBLICATIONS

Reich; "Bubble-fusion scientist debarred from federal funding"; Nature; Nov. 23, 2009; pp. 1-4; doi: 10.1038/news.2009.1103 last accessed Sep. 27, 2012.

Rein et al.; "Phenomena of liquid drop impact on solid and liquid surfaces"; Fluid Dynamics Research, North-Holland, vol. 12, No. 2; Aug. 1, 1993, pp. 61-93.

Seife; "'Bubble Fusion' Paper Generates a Tempest in a Beaker"; Science; Mar. 8, 2002; vol. 295; p. 1808-1809.

Shapira et al.; "Nuclear Fusion in Collapsing Bubbles—Is It There? An Attempt to Repeat the Observation of Nuclear Emissions from Sonoluminscence"; The American Physical Society, vol. 89, No. 10; Sep. 2, 2002; pp. 1-4.

Shi et al.; "Generation of High-Speed Liquid Jets by High-Speed Impact of a Projectile"; JSME Internation Journal, Series B, vol. 38, No. 2; 1995; pp. 181-190.

Shi et al.; "The Measurement of Impact Pressure and Solid Surface Response in Liquid—Solid Impact up to Hypersonic Range"; Wear, vol. 186-187; 1995; pp. 352-359.

Sivakumar et al.; "Spreading behavior of an impacting drop on a structured rough surface"; Physics of Fluids, vol. 17, No. 10; Oct. 2005; pp. 1-10.

Surov; "Interaction of a Shock Wave with a Bubble Screen"; Technical Physics, vol. 44, No. 1; Jan. 1999; pp. 37-43.

Sushchikh et al.; "Shock Waves and Flow Patterns in a Shock-Induced Bubble Collapse"; American Institute of Aeronautics and Astronautics; 2005; pp. 1-13.

Swantek et al.; "Collapse of Void Arrays Under Stress Wave Loading"; Journal of Fluid Mechanics, vol. 649; Apr. 2010; pp. 399-427.

Taleyarkhan et al. "Evidence for Nuclear Emissions During Acoustic Cavitation"; Science, Research Articles, vol. 295; Mar. 2002; pp. 1868-1873.

Taleyarkhan et al.; "Additional evidence of nuclear emissions during acoustic cavitation"; Phys. Rev. E vol. 69; Mar. 22, 2004, pp. 036109-1-036109-11.

Taleyarkhan et al.; "Nuclear Emissions During Self-Nucleated Acoustic Cavitation"; Phys. Rev. Lett. vol. 96; Jan. 10, 2006; pp. 034301-1-034301-4.

Taleyarkhan et al.; "Reply"; The American Physical Society, Physical Review Letters, PRL 97; 2006; p. 149404-1.

Tullis; "Cavitation Guide for Control Valves"; Tullis Engineering Consultants NUREG/CR-6031; Apr. 1993; pp. 1-106, XP000002654460, http://www.iaea.org/inis/collectin/NCLCollectionStore/_Public/24/072/24072618.pdf.

Wolfrum et al.; "Luminescence of transient bubbles at elevated ambient pressures"; The American Physical Society, vol. 64; Sep. 25, 2001; pp. 046306-1-046306-5.

Written Opinion for International Application No. PCT/GB2014/050661, International Filing Date Mar. 6, 2014, dated Jul. 4, 2014, 7 pages.

Written Opinion for International Application No. PCT/GB2014/050663, International Filing Date Mar. 6, 2014, dated Jul. 4, 2014, 7 pages.

Xu et al., "Confirmatory experiments for nuclear emissions during acoustic cavitation," Nuc. Engr. Des. v. 235, Feb. 21, 2005, p. 1318-1324.

Goverdovskii et al "On the prospects of bubble cavitation-induced fusion"; Phys. Usp.; 2013; 56; 423-425.

Lindstrom "Believable statements of uncertainty and believable science"; J Radioanal Nucl Chem; 2017; 311; 1019-1022.

* cited by examiner

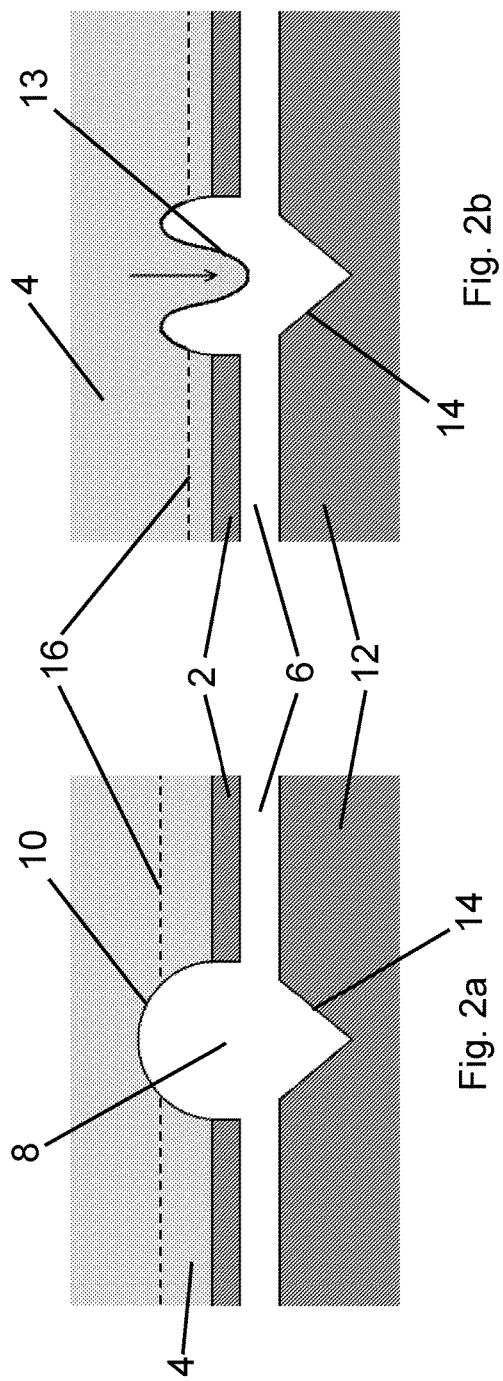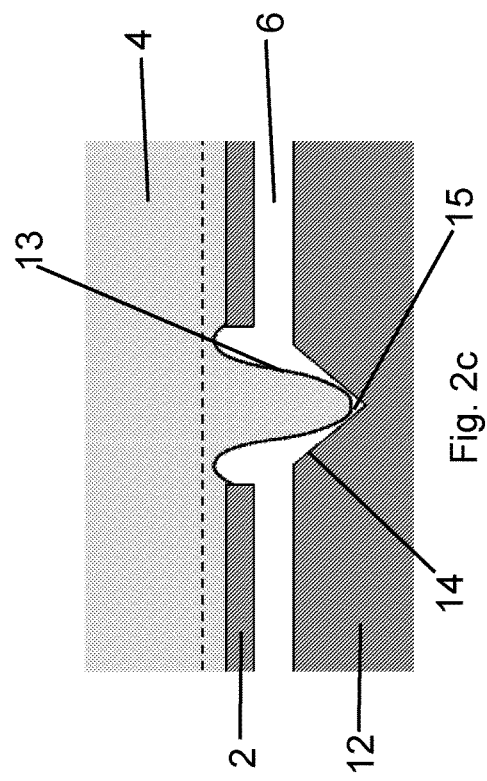

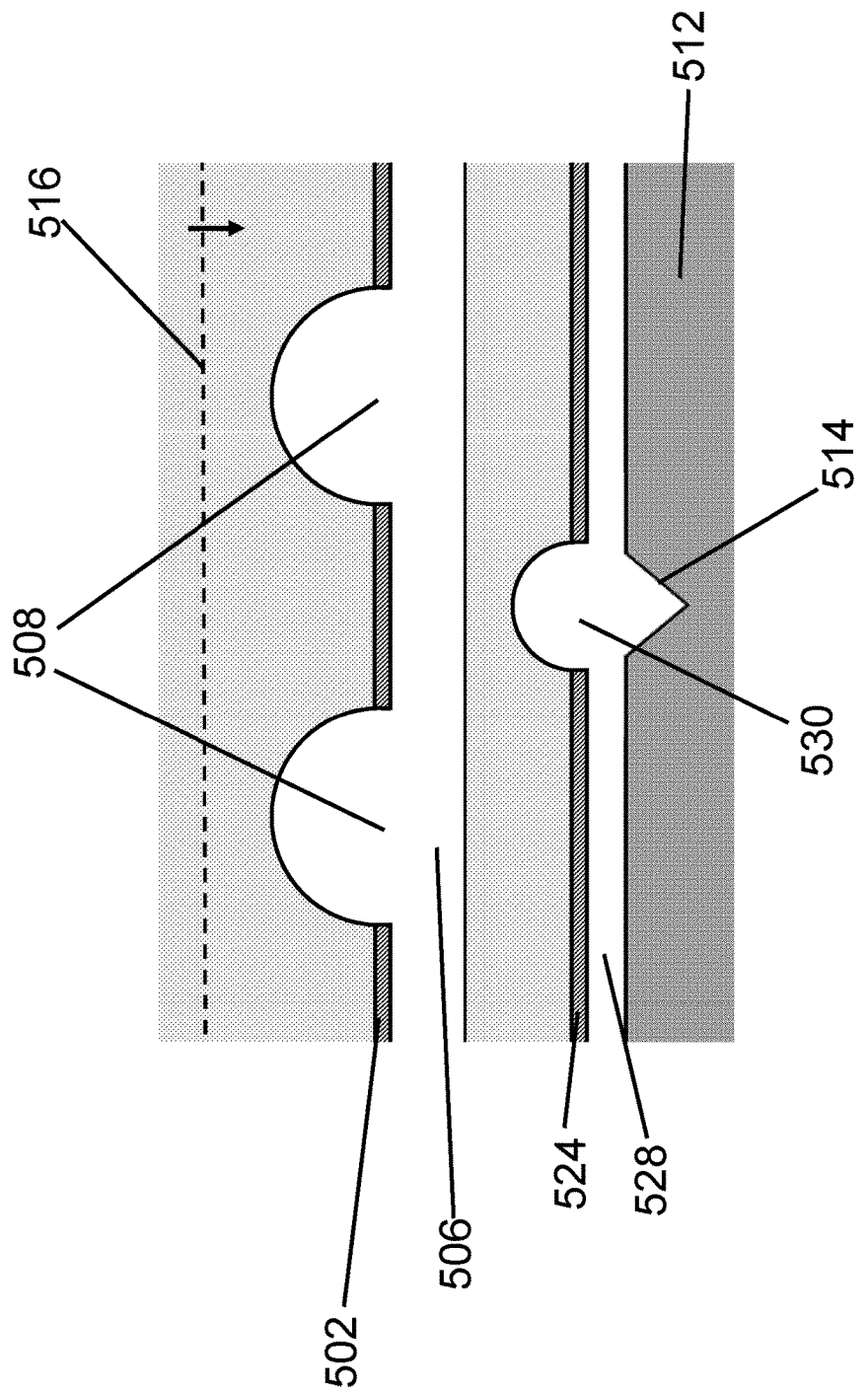

LOCALISED ENERGY CONCENTRATION

CROSS REFERENCE TO RELATED APPLICATIONS

This is a U.S. national stage of application No. PCT/GB2014/050663, filed on 6 Mar. 2014. Priority under 35 U.S.C. § 119(a) and 35 U.S.C. § 365(b) is claimed from Great Britain Application No. 1304046.4 filed on 6 Mar. 2013, the disclosure of which is also incorporated herein by reference in its entirety.

TECHNICAL FIELD

This disclosure relates to methods and apparatuses for producing very high localised energies. It relates particularly, although not exclusively, to generating localised energies high enough to cause nuclear fusion.

BACKGROUND

The development of fusion power has been an area of massive investment of time and money for many years. This investment has been largely centred on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small volumes.

Much of the confidence in the potential in alternative methods of inertial confinement fusion comes from observations of a phenomenon called sonoluminescence. This occurs when a liquid containing appropriately sized bubbles is driven with a particular frequency of ultrasound. The pressure wave causes bubbles to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A., Journal of the Acoustical Society of America, 91(6), 3166-3183 June (1992)]. There have been various efforts to intensify this process and one group has claimed to observe fusion [Taleyarkhan, R. P., West, C. D., Cho, J. S., Lahey, R. T., Nigmatulin, R. I., and Block, R. C., Science, 295(5561), 1868-1873 March (2002)]. However, the observed results have not yet been validated or replicated, in spite of substantial effort [Shapira, D. and Saltmarsh, M., Physical Review Letters, 89(10), 104302 September (2002)]. This is not the only proposed mechanism that has led to luminescence from a collapsing bubble; however it is the most documented. Luminescence has also been observed from a bubble collapsed by a strong shock wave [Bourne, N. K. and Field, J. E., Philosophical Transactions of the Royal Society of London Series A-Mathematical Physical and Engineering Sciences, 357(1751), 295-311 February (1999)]. It is this second mechanism, i.e. the collapse of a bubble using a shockwave, to which this invention relates.

It has been proposed in U.S. Pat. No. 7,445,319 to fire spherical drops of water moving at very high speed (~1 km/s) into a rigid target to generate an intense shock wave. This shock wave can be used to collapse bubbles that have been nucleated and subsequently have expanded inside the droplet. It is inside the collapsed bubble that the above-mentioned patent expects fusion to take place. The mechanism of shockwave generation by high-speed droplet impact on a surface has been studied experimentally and numerically before and is well-documented (including work by one of the present patent inventors, [Haller, K. K., Ventikos, Y., Poulikakos, D., and Monkewitz, P., Journal of Applied Physics, 92(5), 2821-2828 September (2002)]). The present invention differs from U.S. Pat. No. 7,445,319, even though the fundamental physical mechanisms are similar, because it does not utilise a high speed droplet impact.

SUMMARY

The present invention aims to provide alternatives to the aforementioned techniques and may also have other applications. When viewed from a first aspect the invention provides a method of producing a localised concentration of energy comprising creating a shockwave propagating through a non-gaseous medium so as to be incident upon a boundary between the non-gaseous medium and a gaseous medium formed by at least one hole in a barrier separating the non-gaseous medium from a gaseous medium, thereby forming a transverse jet on the other side of the hole which is incident upon a target surface comprising a depression which is spaced from the barrier in the gaseous medium.

The invention also extends to an apparatus for producing a localised concentration of energy comprising:
 a gaseous medium;
 a non-gaseous medium separated from the gaseous medium by a barrier comprising at least one hole therein;
 a target surface comprising a depression which is spaced from the barrier in the gaseous medium; and
 means for creating at least one shockwave propagating through said non-gaseous medium so as to be incident upon a boundary formed by said hole, thereby forming a transverse jet on the other side of the hole.

It has been shown in WO 2011/138622 that an interaction between a shockwave in a non-gaseous medium and a gaseous medium, for example a shockwave striking a gas bubble within a liquid, can generate a high speed transverse jet of the non-gaseous medium that moves through the gaseous medium, which results in the jet impacting on the leeward side of the bubble. In accordance with the present invention this is developed further. The transverse jet created by the shockwave incident upon the boundary traps a volume or "bubble" of the gaseous medium against the target. This gives rise to an intense concentration of energy within the gas by two mechanisms. The first mechanism is a simple transfer of kinetic energy from the jet into potential energy and subsequently into heat energy as the bubble is compressed while it arrests the motion of the jet. This includes heating by the bow shock moving in front of the jet and heating caused by the rebounding of this bow shock and subsequent interactions of further resulting shocks confined within the bubble.

The second mechanism is the transfer of energy from the converging shockwave generated by the impact between the jet and the surface of the target which propagates from the jet into the adjacent bubble. As the edge of the shockwave propagates towards the trapped volume, it is focussed, forming a contracting circle. When this shockwave eventually focuses down near to a point, it results in extremely high pressures and temperatures in the compressed bubble. The large reduction in density of the medium in which the shockwave is travelling in going from the jet to the bubble means that the shockwave generates very high temperatures in the bubble, particularly as it converges to a point.

The transverse jet created when the shockwave in the non-gaseous medium is incident upon the gaseous medium accelerates from the boundary between the non-gaseous and gaseous media to its high speed at the target surface where it traps and compresses a volume of gas. As the jet continues through the gaseous medium it continues to accelerate as the shockwave converges. Therefore, by providing the spacing of the target surface from the hole in the barrier, i.e. where the transverse jet is first formed at the boundary, the jet has space to accelerate further, such that it reaches a higher speed upon impact on the target surface than without such a spacing. The maximum spacing of the target surface from the hole in the boundary is determined by the point at which the transverse jet starts to be become unstable and therefore breaks down into a spray of droplets. Therefore, the spacing of the target surface from the hole in the barrier could be less than 20 times the diameter of the hole, e.g. less than 10 times the diameter, e.g. less than 5 times, e.g. less than twice the diameter of the hole. In a set of embodiments discussed below in which the boundary surface (i.e. the boundary between the non-gaseous and gaseous media) is curved, the spacing could be less than 10 times the radius of curvature of the boundary surface, e.g. less than 5 times, e.g. less than twice the radius of curvature of the boundary surface. In theory there is no minimum spacing, it is simply required that the barrier and the target surface do not touch. In practice however, the spacing must be sufficient to provide a supply of the gaseous medium and, in a set of embodiments discussed below, slide in a new target surface. This spacing allows more energy from the shockwave to be harnessed into the jet and subsequently the impact on the target surface, therefore increasing the compression and heating of the trapped bubble. This is compared to, for example, an arrangement in which the gaseous medium is directly attached to the target surface as a bubble without the presence of a barrier spaced from the target surface as disclosed in WO 2011/138622.

Thus, depending on a variety of factors, such as the spacing between the barrier and the target surface, it may be possible to improve the speed reached by the jet using the present invention. Furthermore, as will be explained below, the spacing of the barrier from the target surface gives a number of other advantages.

Embodiments of the invention may be used to create very high concentrations of energy through the creation of a jet of non-gaseous medium which compresses a volume of gaseous medium against a target surface. Owing to the very high concentrations of energy in the trapped bubble and the adjacent target surface, damage to the target surface will inevitably result. In some embodiments of the invention, for example those in which the target surface includes fuel for nuclear fusion or reactants for a chemical reaction, damage to the target surface is intended. If the invention is to be used for such purposes, in order to obtain a sustainable reaction, repeated impacts at a high repetition rate are desirable. However, it will appreciated that for repeated impacts of the jet onto the target surface, particularly when the target surface is damaged by an impact, the target surface will need to be replaced quickly. The separation of the barrier and the target surface makes this possible, particularly because the target surface is not in contact with any of the non-gaseous medium except when the shockwave is propagating. For example, the target surface could be completely replaced, e.g. the damaged surface slid out and a new surface slid in, or the target surface with a number of different impact sites could be moved along successively to position each impact site relative to the hole in the barrier such that with each repetition, or multiples thereof, of the shockwave in the non-gaseous medium, a new target site on the target surface receives the impact from the transverse jet created.

The separation of the target surface and the barrier allows them to be made from different materials, each suited to their purpose. In order to withstand the pressures created by the shockwave, and possibly multiple shockwaves, in one set of embodiments the barrier is made from a strong material, e.g. high strength steel. The barrier could be reinforced around the perimeter of the hole, as this is where the pressure and energy is likely to be greatest. Conversely, the target surface may not need to have any particular structural strength, as it is not in direct contact with the shockwave other than via the jet. As discussed previously the target surface may be made from, or at least include, a fuel for nuclear fusion or reactants for a chemical reaction.

The separation of the target surface from the non-gaseous medium, i.e. by the barrier, also enables independence of the composition of the non-gaseous medium from the composition of the gaseous medium, e.g. because the non-gaseous medium does not need to be of a composition which allows the gaseous medium to be nucleated within it, but also because different supplies for these two materials can be provided easily either side of the barrier. This independence of the gaseous and non-gaseous materials is particularly advantageous in the chemistry applications of the invention, e.g. sonochemistry and exotic chemistry, where the composition of the materials can be chosen to be suitable to the particular reaction to be investigated.

With the independence of the barrier and the target surface, resulting from their separation, the shape of these two structures, as well as the hole in the barrier, can also be individually tailored. Advantageously the target surface comprises a depression. This can be designed to receive the transverse jet impact such that at least some of the gaseous medium is trapped between the impacting jet and the surface depression, e.g. a bubble of gas is trapped and compressed against the internal surface of the depression by the jet. Depending upon the application for which the apparatus is employed, e.g. nuclear fusion or a chemical reaction, the target surface could be shaped to collect the products from whatever reaction is generated at the surface. For example, the target surface could be arranged at an angle to the horizontal such that the products from the reaction flow down off the surface to a collecting vessel.

The shape of the surface in the depression opposite where the shockwave is incident could be flat so that the jet contacts the surface at a point. In one set of embodiments however the surface depression is arranged such that the initial contact region is a curve which forms a closed loop—e.g. a ring. This increases the ease of trapping a volume of the gaseous medium between the jet tip and the edge of the depression. To achieve this, a section of the target surface has a curvature greater than that of the tip of the jet and this part of the surface is placed such that the jet impacts into it. Upon impacting, a toroidal shockwave is generated whose inner edge propagates towards the base of the depression and towards the trapped portion of gas. Combining this with the 'piston' effect of the gas halting the motion of the impacting jet yields extremely strong heating of the trapped gas. For example, for a given strength of shockwave the peak temperatures can be increased by over an order of magnitude by these arrangements as compared to a volume of gas in contact with a planar surface.

The depression could take a number of shapes. In a set of embodiments it tapers in cross-section away from the mouth. The depression could resemble a dish—e.g. being continuously curved. The surface need not be continuously curved however. In a set of embodiments the surface more closely resembles a crack rather than a dish shape. This could be defined by stating that the depth is greater than the width or by the presence of a region of curvature at the tip of the crack greater than the curvature (or maximum curvature) of the portion of the bubble trapped in it. In one set of embodiments the surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial.

The target surface need not be limited to having a single depression (e.g. to exploit the jetting phenomenon described above) and thus in one set of embodiments, the target surface comprises a plurality of depressions.

In a particular set of embodiments the transverse jet is arranged to strike an area of surface that has been prepared with a particular roughness, microscopic or macroscopic shape such that many small portions of the gaseous medium are trapped between the jet tip and the target surface, i.e. the many small depressions are small in comparison to the size of the transverse jet tip.

In another set of embodiments plural discrete depressions are provided. Each individual depression may be shaped to encourage energy focusing by causing the transverse jet created at the barrier to trap one or more volumes of gas. That is to say, the surface may be prepared with more than one site where the transverse jet will interact with a shaped section of surface in which a volume of the gaseous medium can be trapped, thus providing scalability. An advantage of employing a plurality of depressions is that a greater proportion of the transverse jet energy may be harnessed. Furthermore, owing to the separation of the barrier from the target surface, no changes need to be made to the nature of the gaseous medium or how it is supplied as this will be spread across the plurality of depressions.

It will be appreciated that plural discrete depressions are particularly suited to a set of embodiments in which more than one hole is provided in the barrier. Preferably each depression corresponds to a hole in the barrier, i.e. so that each transverse jet created impacts in its corresponding depression on the target surface. This allows a greater proportion of the initial shockwave incident upon the barrier to be harnessed. The plurality of holes could all comprise the same shape, which simplifies the manufacture of the barrier, or they could be different shapes, e.g. dependent on their position on the barrier. This could be useful in the embodiments in which the shape of the barrier is optimised to control the formation of the transverse jet, e.g. the shape of the hole may depend on the local shape of the barrier. Furthermore, the holes could be arranged, by the shape of the barrier and/or the shape of the holes, such that multiple transverse jets are directed to a single position on the target surface, e.g. where a depression is located, in order to intensify the compression of the trapped bubble at that point. As such it will be appreciated that this can also be applied to the set of embodiments in which only a single depression on the target surface is provided.

The plurality of depressions in the target surface could be formed in a number of ways. For example, a solid surface could be drilled or otherwise machined to produce depressions or pits. In one set of embodiments, however, the depressions are created by the surface texture of the surface. For example, the surface could be blasted with an abrasive material, etched or otherwise treated to give a desired degree of surface roughness which provides, at the microscopic level, a large number of pits or depressions.

The target surface could be constructed from a solid, as implied in many of the embodiments outlined above, but it could equally well be a liquid. In the case of a solid, any of the proposed materials in U.S. Pat. No. 7,445,319 could be suitable. In the case of a liquid the required surface shape (if required, e.g. in the set of embodiments comprising a depression) could be achieved in a number of ways. For example, the surface of a volume of liquid could be excited with a suitable vibration (e.g. using ultrasound or another method) to generate a wave having the desired shape. Alternatively the desired shape could be achieved through the contact angle between a liquid and a solid surface with appropriately matched wetting properties. Of course, this latter example shows that the surface could comprise a combination of solid and liquid. Where the target surface comprises a liquid it will generally be denser than the non-gaseous medium.

The shape of the barrier can also be shaped to control the formation of the transverse jet. More particularly, by designing the barrier explicitly to receive the high speed jetting formed by the interaction of the incident shockwave with the gaseous medium, as the incident shockwave interacts with the surface of the gaseous medium it forms a transmitted shock and a reflected rarefaction. If the contact is the correct shape, i.e. curving away from the incident shockwave, then this rarefaction will act to focus the flow to a point. This then results in the formation of the high speed transverse jet which can, purely as an example, reach over 2000 ms$^{-1}$ for a 1 GPa shockwave. When this jet strikes the target surface, a strong shockwave is generated within by the force of the impact in a manner analogous to the high speed droplet impact situation described in U.S. Pat. No. 7,445,319. The barrier could comprise an overall shape to focus the shockwave towards the hole or, in the set of embodiments in which a plurality of holes in the barrier are provided, the barrier could be shaped locally in the vicinity of each hole to control the formation of each transverse jet created.

As well as the shape of the target surface and/or the shape of the barrier being chosen to optimise formation of the transverse jet and the compression of the trapped bubble, the shape of the hole in the barrier can also be chosen to aid the formation of the transverse jet. The hole could comprise one of a number of different shapes, e.g. circular, through the barrier with a constant cross section. However, the cross section could flare or taper through the barrier in the direction of the gaseous medium in order to control formation of the transverse jet and focus or direct it onto the target surface, e.g. towards a depression. In this regard, the region on the target surface upon which the transverse jet is intended to impact, e.g. the depression, does not need to be positioned directly opposite the hole from which the transverse jet originates, the shape of the barrier and/or the hole could be arranged to control this.

The shape of each hole can also be used to control the shape of the boundary between the gaseous and non-gaseous media in the hole. The boundary shape can also be controlled by the relative pressures of the gaseous medium to the non-gaseous medium. As will be appreciated, this is particularly simple to control with the arrangement of the present invention because of the separation between the barrier and the target surface. In one set of embodiments the apparatus comprises means to control the pressure of the gaseous medium. These means, or alternative means, e.g. a gas supply in fluid communication with the gaseous medium, can also be used to replenish the gaseous medium after a shockwave has been applied to the non-gaseous medium. This set of embodiments has the advantage of great control over the contents and size of the gaseous medium generated, as well as allowing the gaseous medium to be replenished quickly, i.e. compared to nucleating a bubble in the non-gaseous medium, enabling the shockwaves to be applied at a high repetition rate, giving another advantage resulting from the separation of the barrier from the target surface.

The shape of the boundary between the non-gaseous and gaseous media could be flat. However in one set of embodiments, alluded to above, the boundary is non-flat, i.e. curved. Preferably the gaseous medium protrudes into the non-gaseous medium through the hole, i.e. the boundary is convex. This convex shape has been found to be particularly advantageous in forming the transverse jet as the rarefaction fan, which is formed when the shockwave is incident upon the boundary, acts to focus the flow of the non-gaseous medium to a point, thereby forming a narrow jet in which energy from across the surface of the boundary is harnessed. This is considered novel and inventive in its own right and thus when viewed from a further aspect the invention provides a method of producing a localised concentration of energy comprising creating a shockwave propagating through a non-gaseous medium so as to be incident upon a convex boundary between the non-gaseous medium and a gaseous medium formed by at least one hole in a barrier separating the non-gaseous medium from a gaseous medium, thereby forming a transverse jet on the other side of the hole which is incident upon a target surface which is spaced from the barrier in the gaseous medium.

The invention also extends to an apparatus for producing a localised concentration of energy comprising:
 a gaseous medium;
 a non-gaseous medium separated from the gaseous medium by a barrier comprising at least one hole therein which forms a boundary which is convex in the non-gaseous medium;
 a target surface which is spaced from the barrier in the gaseous medium; and
 means for creating at least one shockwave propagating through said non-gaseous medium so as to be incident upon the boundary formed by said hole, thereby forming a transverse jet on the other side of the hole.

In one set of embodiments the initial shockwave applied to the non-gaseous medium might be arranged to conform to the shape of the boundary between the non-gaseous and gaseous media which could increase the intensity of the transverse jet created is increased.

In one set of embodiments the microstructure or wetting characteristics of the barrier and/or the edge of the hole can be optimised to control the boundary shape. For example the barrier and/or the hole could comprise hydrophobic and/or hydrophilic surfaces or coatings (or materials with affinities and repulsions to types of fluids other than water). Providing a particular microstructure or wetting characteristics of the barrier and/or hole, in combination with the means to replenish the gaseous medium, again can aid rapid formation of the gaseous medium at the boundary to enable a high repetition rate for the shockwaves. For example the perimeter of the hole could comprise a hydrophobic material, outside of which is a hydrophilic material to control the position boundary of the gaseous and non-gaseous media as well as the contact angle of the boundary with the barrier.

In a further set of embodiments the surface tension of the non-gaseous medium can be used to control the boundary shape. In another set of embodiments a standing pressure wave, e.g. a standing ultrasound wave, is applied to the non-gaseous medium to control the boundary shape. This technique can also be used to encourage the reformation of the gaseous medium at the boundary following a shockwave, again enabling a high repetition rate for the shockwaves.

Yet a further technique has been envisaged by the inventors to control the boundary shape and to enable a high repetition rate for the shockwaves. In one set of embodiments the apparatus comprises a membrane which defines the boundary between the gaseous and non-gaseous media, e.g. a pre-manufactured membrane, which defines the boundary shape. The use of a thin membrane in this manner allows a decoupling of the non-gaseous and gaseous materials, allowing any choice of combination of compositions to be made. It also allows the boundary shape to be controlled with a precision not available to other methods. The membrane could be formed from any suitable material, e.g. glass, e.g. plastic, e.g. rubber.

Having a prefabricated membrane allows a non-gaseous medium, e.g. a liquid, to be used more easily as the gaseous medium is trapped on its side of the barrier and therefore cannot float away through the hole or otherwise be disturbed. In a particular set of embodiments the membrane is frangible and is arranged to break upon impact from the shockwave such that it has no influence on the resulting dynamics. In one set of embodiments the prefabricated membrane includes a line or region of weakness, so that upon impact from the shockwave it breaks along the line or in the region of weakness. The line or region of weakness can be arranged so that the position of the breach has an influence on the ensuing flow patterns, for example this could help control the formation and dynamics of the transverse jet. In another set of embodiments the membrane is designed to deform with the collapsing boundary.

In the set of embodiments in which a plurality of holes are provided in the barrier, a separate membrane could be provided to cover each of the holes. However in one set of embodiments the membrane is arranged to cover two or more of the holes in the barrier. This is easier to arrange, particularly when a high repetition rate for multiple shockwaves to be applied to the non-gaseous medium are desired. For example, a new membrane could be slid into the apparatus prior to each application of the shockwave, similar to the arrangement for the target surface as discussed above. Indeed the target surface and membrane could be slid into place simultaneously, e.g. pre-fabricated with the gaseous medium therebetween.

In one set of embodiments the apparatus comprises a plurality of barriers, each barrier comprising at least one hole therein and separating a gaseous medium from a non-gaseous medium. In this way, the energy from the initial shockwave can be intensified with each successive incidence upon a barrier and a non-gaseous medium thereby harnessing a greater amount of the energy from the initial shockwave onto the target surface. Each volume of non-gaseous medium and gaseous medium either side of the barriers need not comprise the same composition. For example in a set of embodiments with two barriers, the shockwave could be applied to a first non-gaseous medium to be incident upon a boundary with first gaseous medium at a hole in the first barrier, and then subsequently incident upon a second non-gaseous medium and then a second boundary with a second gaseous medium at a hole in the second barrier before being incident upon the target surface.

In embodiments in which the general orientation of the barriers is horizontal, the intermediate layers of gaseous medium could simply float above the respective layers of non-gaseous medium. However in one set of embodiments the apparatus comprises a membrane separating the boundary between the non-gaseous and gaseous media away from the boundary, which is particularly advantageous in the embodiments in which the general orientation of the barriers is away from the horizontal, to retain the respective positioning of the non-gaseous and gaseous media. This can be in addition to or instead of a membrane across the holes at the barriers.

The holes in adjacent barriers could be directly aligned with each other in order to direct the transverse jet created at one barrier onto the non-gaseous medium at the corresponding hole in the next barrier. Alternatively the holes could be arranged such that multiple transverse jets from one barrier are directed towards the non-gaseous medium at a single hole in the next barrier, or vice versa, i.e. a single jet to multiple holes. This former alternative can be seen to be particularly advantageous as the multiple converging jets intensify the shockwave incident upon the next non-gaseous layer. Therefore if successive layers of non-gaseous and gaseous material are arranged in this manner, a large amount of energy from the initial shockwave can be harnessed and focussed onto the final gaseous material which is trapped and compressed against the target surface. It will also be appreciated that any of these arrangements can be combined with any number of the embodiments discussed above, e.g. with regard to the shape of the holes, the shape of the barrier, etc, in order to control the formation of the transverse jets and the resultant shockwaves. In particular, the barriers could be shaped to focus the initial and/or resultant shockwaves onto the one or more holes and/or the target surface, e.g. to conform to the shape of the boundary between the gaseous and non-gaseous media at the one or more holes in the subsequent barrier.

Of course, as has already been alluded to, some embodiments may comprise a plurality of volumes of the gaseous medium. However, in addition or instead of these multiple volumes which are each in contact with a respective barrier, the inventors have envisaged a further arrangement in which the initial shockwave can be focussed onto the final target surface. In one set of embodiments the apparatus comprises one or more pockets of fluid within the non-gaseous medium which are positioned relative to the one or more holes in the barrier such that the incidence of the shockwave on the first pocket of fluid concentrates the intensity of the shockwave subsequently incident upon the gaseous medium. Preferably the fluid comprises a gas, e.g. of the same composition as the gaseous medium.

It will be appreciated that the one or more pockets of fluid within the non-gaseous medium (and any layer thereof), as with the multiple layers of non-gaseous and gaseous media, acts to harness a greater proportion of the initial shockwave than is incident upon a single hole in the barrier. The incidence of the shockwave on the pocket of fluid causes a transverse jet to be formed which accelerates across the volume of the pocket and impacts on the leeward side of the pocket. This impact results in an outward moving shockwave which can be over ten times the pressure of the incident shockwave. The pocket of fluid is positioned relative to the one or more holes in the barrier such that this more intense shockwave then interacts with the gaseous medium with a greater pressure than if the initial shockwave had been incident upon it. As with the multiple holes in the barrier for the multiple layers, multiple fluid pockets can be positioned in the non-gaseous medium to generate transverse jets which subsequently impact on the gaseous medium at one or more holes in the barrier.

As well as creating a particular shape for one or more of the target surface, the barrier, the hole in the barrier, and the boundary, in one set of embodiments the micro-structure or wetting characteristics of one or more of the target surface, the barrier and the hole can be optimised to control the speed of the shockwave near the target surface, e.g. to increase the speed near the target surface, thereby changing the shockwave's shape and hence the nature of the interaction between the shockwave and the trapped bubble. As previously discussed, an appropriately shaped boundary between the non-gaseous and gaseous media can be used in this set of embodiments to match the shape of the shockwave to the shape of the boundary, thereby allowing the dynamics of the transverse jet formation to be controlled in order to maximise the temperature and density achieved on compression of the trapped bubble.

The invention described herein provide alternatives to the technique described in U.S. Pat. No. 7,445,319 which may carry their own benefits. The present inventors have recognised that there are significant challenges in the nucleation of a bubble in a droplet fired at high speed into a target, as suggested in U.S. Pat. No. 7,445,319. The timing will have to be very precise for the bubble to be at a favourable moment of its expand-collapse cycle when the shock strikes. The method by which the high speed droplets are created as required by U.S. Pat. No. 7,445,319 and detailed in U.S. Pat. No. 7,380,918 is also complex and expensive. By contrast such complexity and associated expense can be avoided in accordance with at least preferred embodiments of the present invention. Thus, the various aspects of the present invention provide much simpler techniques for compressing a bubble trapped by a jet from a non-gaseous medium, as a shockwave simply needs to be created within the non-gaseous medium. Moreover the theoretical and computer modelling of both techniques carried out by the present inventors suggests that the method in accordance with the present invention can give pressure and temperature intensities which are an order of magnitude greater than the method detailed in U.S. Pat. No. 7,445,319.

The more static framework that can be employed in accordance with the invention to compress a gas bubble using a shockwave allows much greater control (compared to a free bubble) over how the shockwave strikes the gaseous medium and interacts with the trapped bubble.

The initial shockwave could be created in a number of different ways by a number of different devices depending on the pressure required. For example, an explosive plane wave generator could be used to provide high intensity shockwaves. Alternatively a gas gun could be used to strike a projectile into a diaphragm or piston in contact with the non-gaseous medium to create the shockwave. In preferred embodiments such an explosive device can create a shockwave pressure of between 0.1 GPa and 50 GPa. If a shockwave is to be repeatedly applied to the non-gaseous medium, the repetition rate might be greater than 0.1 Hz, e.g. greater than 1 Hz, e.g. greater than 10 Hz, e.g. greater than 100 Hz, e.g. greater than 1 kHz, e.g. 20 kHz.

The Applicant notes that the scope of the present invention does not extend to the shockwave comprising an ultrasound shockwave and thus being created by a device that generates ultrasound shockwaves, e.g. a lithotripsy device. Thus the scope of the present invention does not include the pocket of gas being collapsed through the process of sonoluminescence.

The term "gaseous medium" and "gas" as used herein should be understood generically and thus not as limited to pure atomic or molecular gases but also to include vapours, suspensions or micro-suspensions of liquids or solids in a gas or any mixture of these. The "non-gaseous medium" should be understood generically and thus could include liquids, non-Newtonian liquids, semi-solid gels, materials that are ostensibly solid until the passage of the shockwave changes their properties, suspensions or micro-suspensions and colloids. Examples include but are not limited to water, oils, solvents such as acetone, hydrogels and organogels. It should be understood that the non-gaseous medium will have a greater density than the gaseous medium.

The non-gaseous medium could be any suitable substance for creating a shockwave in, such as a liquid or a semi-solid gel. The gaseous medium can be provided as described above between the barrier and the target surface. Using a gel or a viscous liquid has the advantage that it is easier to control the detailed shape of the boundary between the gaseous and non-gaseous media at the hole in the barrier, compared to a lower viscosity liquid in which the buoyancy of the non-gaseous medium may overcome the viscosity of the liquid. Furthermore, the non-gaseous and/or gaseous media could comprise additives, e.g. surfactants to control the surface tension, and therefore the shape, of the boundary between the gaseous and non-gaseous media.

In a preferred set of embodiments, the methods described herein are employed to generate nuclear fusion reactions. The fuel for the reaction could be provided by the gaseous medium, the non-gaseous medium, or the fuel could be provided by the target surface itself. Any of the fuels mentioned in U.S. Pat. No. 7,445,319 is suitable for use in the present invention.

The fusion reactions which can be obtained in accordance with certain embodiments of the invention could be used for net energy production (the long term research aim in this field), but the inventors have appreciated that even if the efficiency of the fusion is below that required for net energy production, the reliable fusion which is obtainable in accordance with embodiments of the invention is advantageous for example in the production of tritium which can be used as fuel in other fusion projects and is very expensive to produce using currently existing technologies, e.g. using a nuclear fission reactor. The fusion can also be beneficial in giving a fast and safe neutron source that is cheaper and more compact than conventional alternatives. Those skilled in the art will appreciate that this has many possible applications, e.g. shipping container scanning to name one.

Moreover, it is not essential in accordance with the invention to produce fusion at all. For example, in some embodiments the techniques and apparatus of the present invention may be advantageously employed as an exotic chemistry reactor which can be used to access extreme and unusual conditions, or simply to produce substantial heating particularly which is localised in its concentration.

BRIEF DESCRIPTION OF DRAWINGS

Certain embodiments of the invention will now be described, by way of example only, with reference to the accompanying drawings, in which:

FIGS. 2a-2c show three successive stages of an interaction of a shockwave with the gaseous medium shown in FIG. 1;

FIG. 7 shows a variant of the embodiment of FIG. 6 comprising two holes in the upper layer.

DETAILED DESCRIPTION

Figure 1:
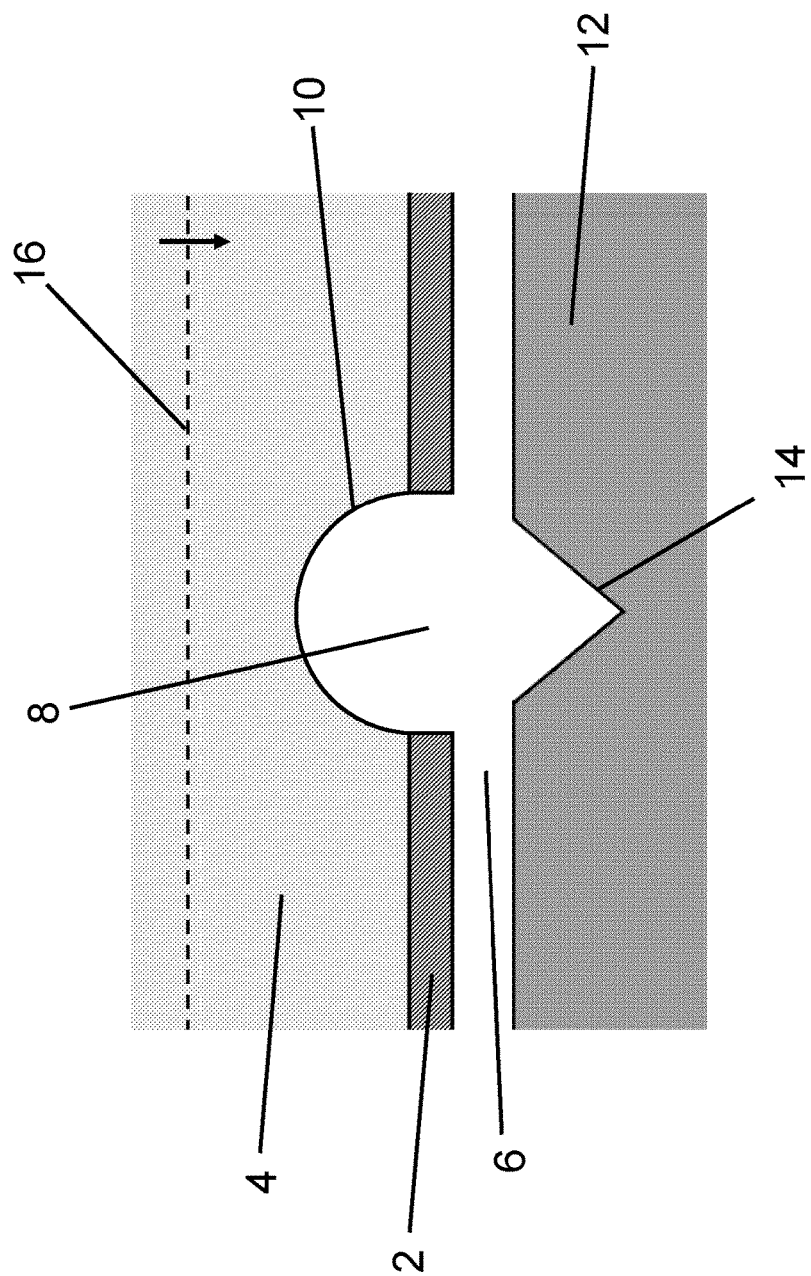
FIG. 1 shows an embodiment in accordance with the invention.

FIG. 1 shows schematically an arrangement in accordance with the invention. A solid barrier 2, for example made from high strength steel or a titanium alloy, is placed between a non-gaseous medium 4 in the form of a hydrogel, for example a mixture of water and gelatine, and a gaseous medium 6, e.g. a vaporous fuel suitable for taking part in a nuclear fusion reaction. A hole 8 is formed in the barrier 2, thus allowing a boundary 10 to form at the contact surface between the non-gaseous medium 4 and the gaseous medium 6. The boundary 10 between the non-gaseous medium 4 and the gaseous medium 6 is defined in the hydrogel as a hemi-spherical surface protruding into the non-gaseous medium 4. A solid target surface 12, made from any suitable material, e.g. containing nuclear fuel or reactants, is placed spaced from and parallel to the barrier 2 on the other side of the non-gaseous medium. It will be appreciated that there is no constraint on the material of the target surface needing to withstand a shockwave, giving a large range of possible materials. The target surface 12 comprises a concave, V-shaped, depression 14 opposite the hole 8 in the barrier 2 which is filled with the gaseous medium 6. The depression 14 could be machined or formed as the result of a crack in the target surface 12. The size of the apparatus is not essential but a typical dimension of this diagram could be between 0.1 and $1 \times 10^{-5}$ m.

The operation of this embodiment will now be described, with particular reference to the three successive stages shown in FIGS. 2a-2c of a shockwave 16 interacting with the gaseous medium 6. Initially, a shockwave 16 is created from an explosion, for instance with a pressure of 5 GPa, within the non-gaseous medium 4. This is represented in FIG. 1 as a line 16 propagating in the direction of the arrow towards the barrier 2.

First the shockwave 16 strikes the upper part of the boundary 10, as shown in FIG. 2a, causing a portion of the shockwave 16 to be reflected as a result of the large change in density from the non-gaseous medium 4 to the gaseous medium 6. This reflected portion forms a rarefaction fan which propagates away from the gaseous medium 6 and therefore creates a low pressure region between the reflected portion of the shockwave and the gaseous medium 6 at the boundary 10.

The non-gaseous medium 4 flows into this low pressure region as a transverse jet 13 which than traverses the gaseous medium 6, as shown in FIG. 2b. The spacing of the barrier 2 from the target surface 12 allows the jet 13 to accelerate through the gaseous medium 6 until it impacts in the depression 14 on the target surface 12, trapping a volume 15 of the gaseous medium 6 between the tip of the jet 13 and the tapering depression 14 in the target surface 12, as shown in FIG. 2c. The compression of the gaseous fuel inside the trapped volume causes intense local heating which can be sufficient to generate a nuclear fusion reaction.

Figure 3:
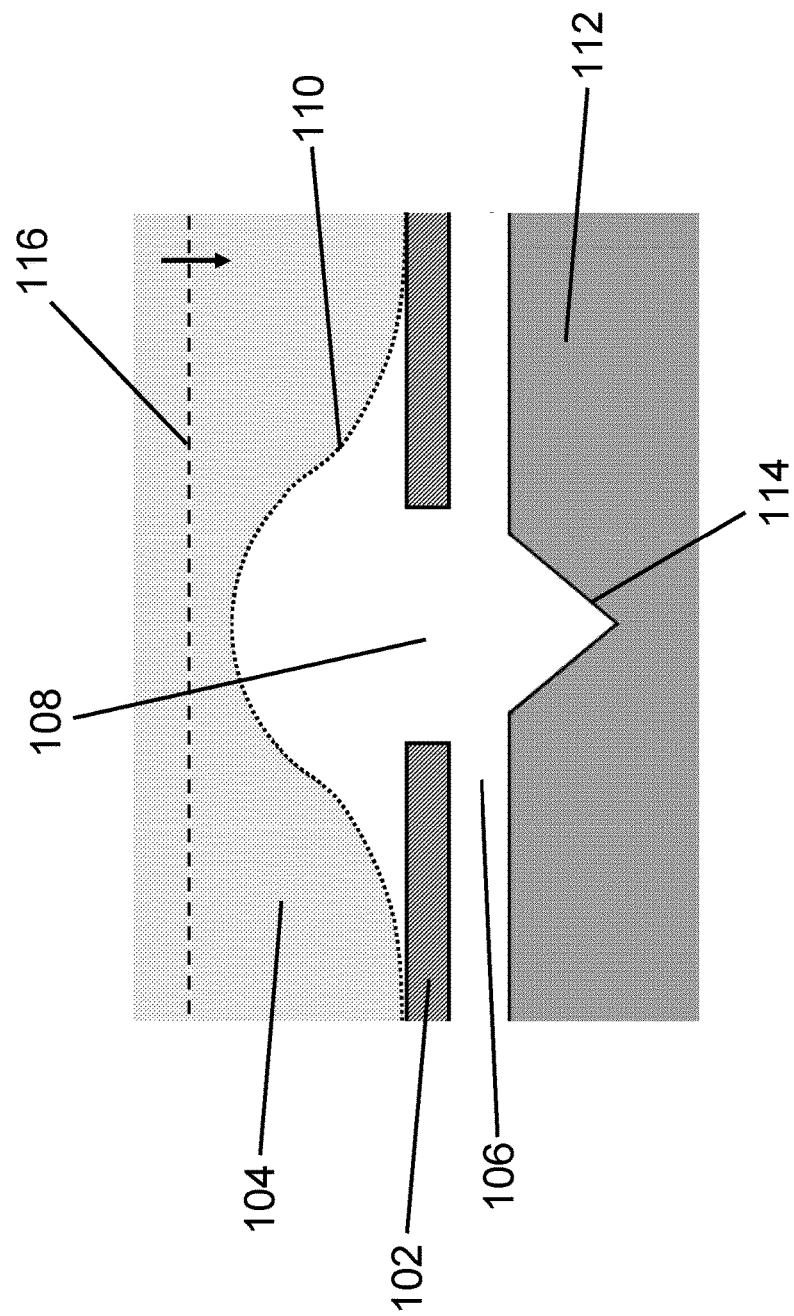
FIG. 3 shows a variant of the embodiment of FIG. 1 comprising a membrane.

FIG. 3 shows a variant of the embodiment shown in FIG. 1, in which the non-gaseous medium 104 is separated from the gaseous medium 106 by a pre-fabricated membrane 110 which is positioned over the hole 108 in the barrier 102. The pre-fabricated membrane 110 is frangible, i.e. it is designed to break on the impact of the shockwave 116. Once the pre-fabricated membrane 110 has been broken by the impact of the shockwave 116, the resultant transverse jet continues to propagate into the gaseous medium 106, trapping a small volume of the gaseous medium against the target surface 112 in the depression 114, in the same manner as for the previous embodiment. The pre-fabricated membrane 110 also allows the non-gaseous medium 104 to be made from a liquid as it prevents the gaseous medium 106 from floating up through the hole 108 and escaping.

Figure 4:
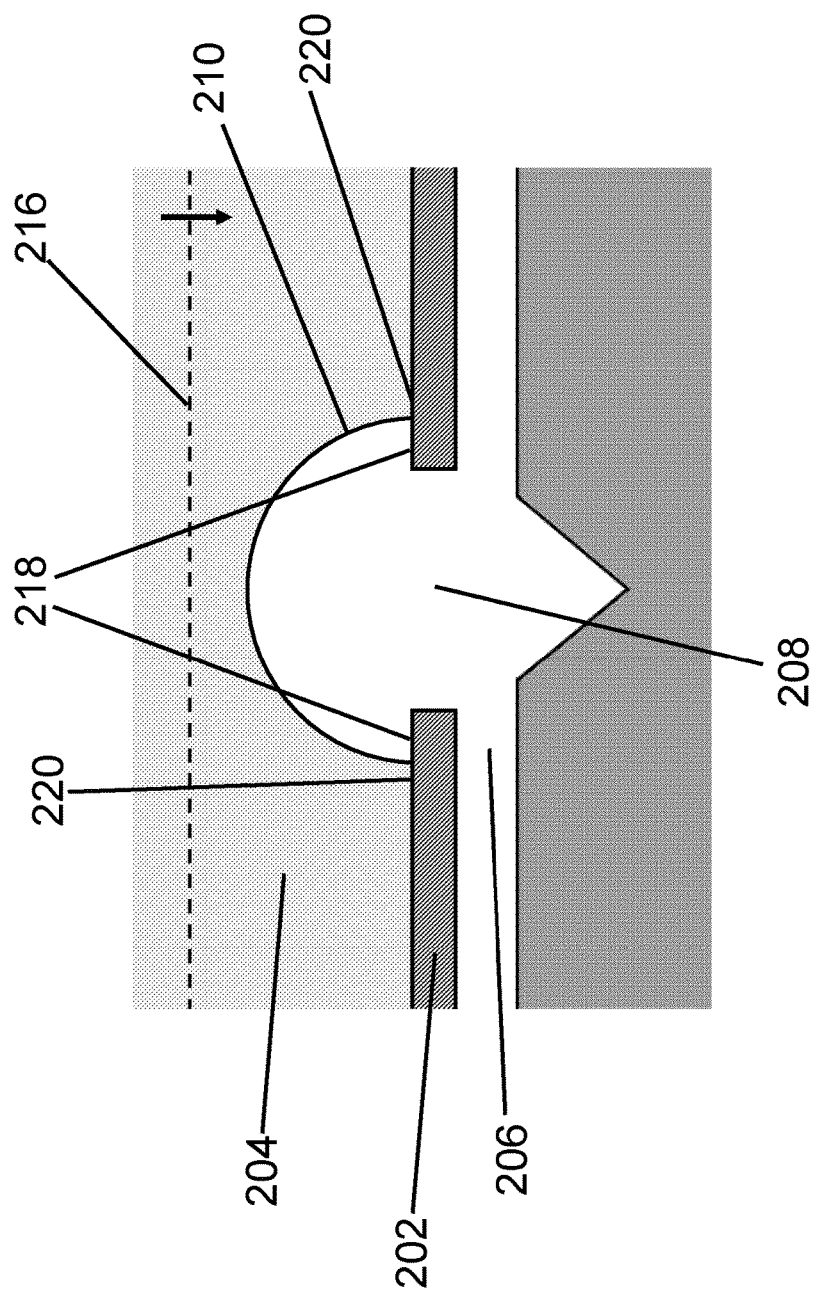
FIG. 4 shows a variant of the embodiment of FIG. 1 comprising hydrophilic and hydrophobic areas.

FIG. 4 shows another variant of the embodiment shown in FIG. 1, in which the perimeter of the hole 208 in the barrier 202 is coated in a hydrophobic material 218 and outside of this the barrier 202 is coated in a hydrophilic material 220. The combination and relative positioning of the hydrophobic material 218 and the hydrophilic material 220 allow the boundary 210 between the non-gaseous medium 204 and the gaseous material 206 to be located accurately and with repeatability, e.g. when replenishing the gaseous medium 206 after the application of a shockwave 216. The coatings of the hydrophobic material 218 and the hydrophilic material 220 also help to shape the boundary 210, i.e. to make it stand up into its hemi-spherical shape.

Figure 5:
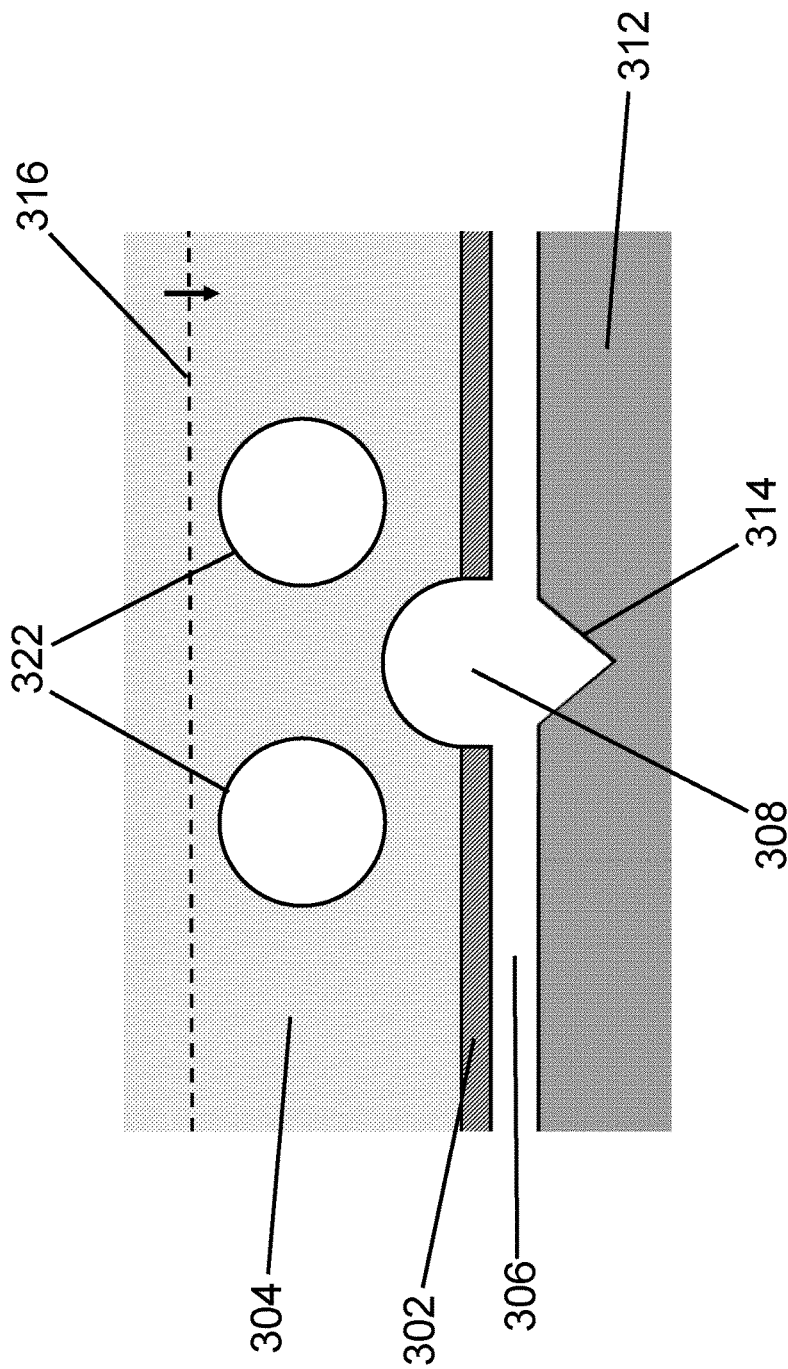
FIG. 5 shows a variant of the embodiment of FIG. 1 comprising focussing bubbles.

FIG. 5 shows a further variant of the embodiment shown in FIG. 1, in which two pockets of gas 322 are positioned within the non-gaseous medium 304, symmetrically spaced above and to the side of the hole 308 in the barrier 302. In operation, the shockwave 316 is first incident upon the upper surface of the two pockets of gas 322 and, in a similar manner to the shockwave interacting with the gaseous medium 306 at the hole 308 as described with reference to the above embodiments, a transverse jet of the non-gaseous medium 304 is formed which travels across the volume of each of the pockets of gas 322 such that it impacts on the leeward surface of each of the pockets of gas 322. These impacts create a resultant shockwave, which is more intense than the initial shockwave 316 applied to the non-gaseous medium 304, and which subsequently is incident upon the gaseous medium 306 at the hole 308 in the barrier 302. This resultant shockwave interacts with the gaseous medium 306, thus subsequently trapping a volume of the gaseous medium 306 against the target surface 312 in the depression 314, as described above for the previous embodiments.

Figure 6:
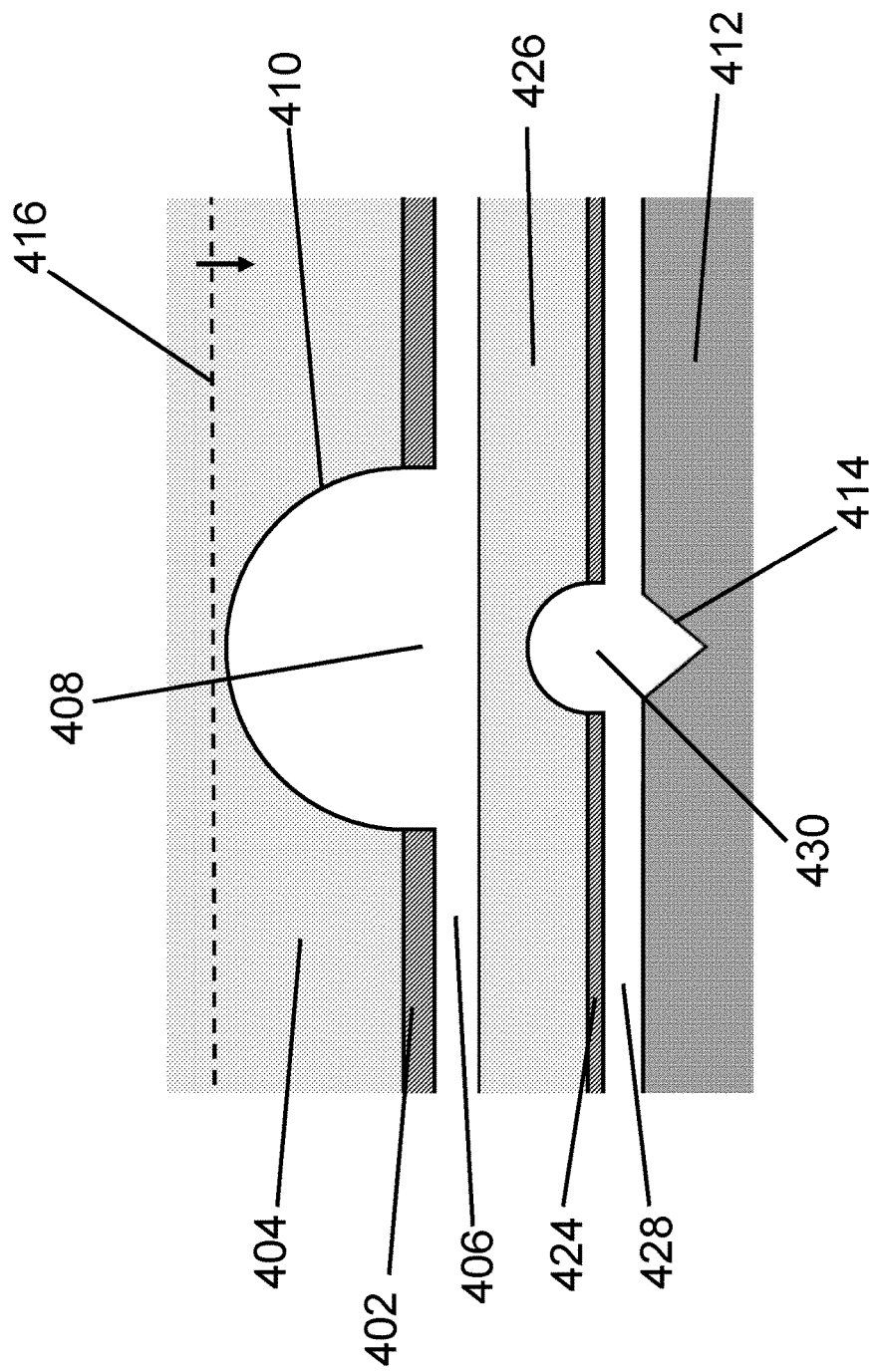
FIG. 6 shows a variant of the embodiment of FIG. 1 comprising two layers.

FIG. 6 shows yet another variant of the embodiment shown in FIG. 1, in which a lower barrier 424 is provided below and parallel to the upper barrier 402. A first layer of non-gaseous medium 404 is provided above the upper barrier 402 with a layer of gaseous medium 406 below, and a second layer of non-gaseous medium 426 is provided above the lower barrier 424 with a layer of gaseous medium 428 below. In operation, the shockwave 416 is first incident upon the boundary 410 between the first layer of non-gaseous medium 404 and the first layer of gaseous medium 406 and, in a similar manner to the shockwave interacting with the gaseous medium 406 at the hole 408 as described with reference to the above embodiments, a transverse jet of the non-gaseous medium 404 is formed which travels across the first layer of gaseous medium 406 such that it impacts on the second layer of non-gaseous medium 426. This impact creates a resultant shockwave in the second layer of non-gaseous medium 426, which is more intense than the initial shockwave 416 applied to the first layer of non-gaseous medium 404, and which subsequently is incident upon a boundary with the second layer of gaseous medium 428 formed by the hole 430 in the lower barrier 424. The resultant transverse jet passes through the second layer of gaseous medium 428, thus subsequently trapping a volume of the gaseous medium 428 against the target surface 412 in the depression 414, as described above for the previous embodiments.

FIG. 7 shows a variant of the embodiment shown in FIG. 6, in which two holes 508 are provided in the upper barrier 502 symmetrically spaced above and to the side of the hole 530 in the lower barrier 524. The operation of this embodiment is very similar to the embodiment shown in FIG. 6, apart from that two resultant transverse jets are created in the first layer of gaseous medium 506 which combine and eventually are incident upon the second layer of gaseous medium 528, thereby harnessing a greater proportion of the energy from the initial shockwave 516 which is channelled into the final transverse jet which traps a volume of the gaseous medium 528 in the depression 514 in the target surface 512.

Although specific examples have been given, it will be appreciated that there are a large number of parameters that influence the actual results achieved, for example liquid or gel medium density, ambient pressure and temperature, composition of the gaseous medium and of the non-gaseous medium, impact angle and shape of the shockwave, target surface shape and micro-structure of the target surface, barrier shape, number of barriers and layers of non-gaseous and gaseous media, and the shape of the boundary between the non-gaseous and gaseous media.

In each of the embodiments described above, the diagrams shown are a vertical cross-section through a three-dimensional volume of the gaseous medium and target surface and hence they depict embodiments that are rotationally symmetric. However, this is not essential to the invention. In particular the surface could comprise discrete surface portions in the rotational direction either instead of, or as well as in the vertical cross-section shown. In the latter case the target surface would be multi-facetted. Each facet could give rise to separate but converging shockwaves.

In all of the embodiments described, the apparatus can be used by creating a shockwave in the medium which is incident upon a bubble containing deuterated water vapour.

In numerical modelling of the experiment, the techniques described herein give rise to a peak pressure of ~20 GPa which is sufficient to cause temperatures inside the collapsed volume of gas in excess of $1 \times 10^6$ Kelvin which can be sufficient for a nuclear fusion reaction of the deuterium atoms. In some non-limiting examples the resulting neutrons could be used in other processes, or could be absorbed by a neutron absorber for conversion of the kinetic energy of the neutrons to thermal energy and thus conventional thermodynamic energy generation.

The invention claimed is:

1. A method of producing a localised concentration of energy comprising creating a shockwave propagating through a non-gaseous medium so as to be incident upon a boundary between the non-gaseous medium and a gaseous medium formed by at least one hole in a barrier separating the non-gaseous medium from a gaseous medium, wherein one or more of the viscosity, the chemical composition and the pressure of the non-gaseous medium and/or the gaseous medium, the orientation of the hole or barrier, and/or a membrane defining the boundary, is arranged to control the separation of the non-gaseous medium from the gaseous medium at the boundary in the hole, and wherein the incidence of the shockwave on the boundary thereby forms a transverse jet on the other side of the hole which is incident upon a target surface comprising a depression which is spaced from the barrier in the gaseous medium.

2. A method as claimed in claim 1, wherein the target surface is spaced from the hole in the barrier by a distance of less than 20 times the diameter of the hole.

3. A method as claimed in claim 1, further comprising replacing the target surface by sliding the target surface laterally to provide a new target site for incidence of the transverse jet.

4. A method as claimed in claim 1, wherein the target surface comprises a plurality of depressions.

5. A method as claimed in claim 1, wherein the barrier comprises a plurality of holes.

6. A method as claimed in claim 5, wherein the target surface comprises a plurality of depressions and wherein each depression corresponds to a hole in the barrier so that the transverse jet created from each hole in the barrier is incident upon the corresponding depression on the target surface.

7. A method as claimed in claim 5, wherein the shape of the barrier and/or the shape of the holes controls the formation of transverse jets directed to a single position on the target surface where the depression is located.

8. A method as claimed in claim 1, wherein the shape of the barrier focuses the shockwave towards the hole to control the formation of the transverse jet.

9. A method as claimed in claim 1, wherein the shape of the barrier controls the formation of the transverse jet.

10. A method as claimed in claim 1, wherein the shape of the edge of the barrier defining the hole in the barrier controls the shape of the boundary between the gaseous and non-gaseous media in the hole.

11. A method as claimed in claim 1, wherein the shape of the boundary between the gaseous and non-gaseous media at the hole in the barrier is controlled by the relative pressure of the gaseous medium to the pressure of the non-gaseous medium.

12. A method as claimed in claim 1 claim, wherein the boundary between the gaseous and non-gaseous media in the hole is curved.

13. A method as claimed in claim 12, wherein the target surface is spaced from the hole in the barrier by a distance of less than 10 times the radius of curvature of the boundary surface.

14. A method as claimed in claim 12, wherein the barrier and/or the edge of the barrier defining the hole comprise a hydrophobic and/or hydrophilic surface or coating which controls the shape of the boundary between the non-gaseous and gaseous media.

15. A method as claimed in claim 12, wherein the surface tension of the non-gaseous medium controls the shape of the boundary between the non-gaseous and gaseous media.

16. A method as claimed in claim 12, comprising applying a standing wave to the non-gaseous medium to control the shape of the boundary between the non-gaseous and gaseous media.

17. A method as claimed in claim 12, wherein the boundary between the gaseous and non-gaseous media is defined by a membrane which defines the shape of the boundary.

18. A method as claimed in claim 12, wherein the shape of the barrier conforms the shape of the shockwave applied to the non-gaseous medium to the shape of the boundary between the non-gaseous and gaseous media.

19. A method as claimed in claim 1, comprising a plurality of barriers, each barrier separating respective layers of a gaseous medium from a non-gaseous medium, and wherein each barrier comprises at least one hole therein which forms a boundary between the respective non-gaseous medium and the gaseous medium.

20. A method as claimed in claim 19, wherein the holes in one barrier are arranged such that multiple transverse jets from this barrier are directed towards the non-gaseous medium at a single hole in the next barrier.

21. A method as claimed in claim 19, wherein the shape of the barriers focuses the incidence shockwave and/or one or more resultant shockwaves onto the one or more holes in a subsequent barrier and/or onto the target surface.

22. A method as claimed in claim 1, comprising one or more pockets of fluid within the non-gaseous medium which are positioned relative to the at least one hole in the barrier such that the shockwave is first incident upon the first pocket of fluid which concentrates the intensity of the shockwave subsequently incident upon the gaseous medium at the at least one hole in the barrier.

23. A method as claimed in claim 1, wherein the target surface comprises reactants for a chemical reaction.

24. A method of producing a localised concentration of energy comprising creating a shockwave propagating through a non-gaseous medium so as to be incident upon a convex boundary between the non-gaseous medium and a gaseous medium formed by at least one hole in a barrier separating the non-gaseous medium from a gaseous medium, wherein one or more of the viscosity, the chemical composition and the pressure of the non-gaseous medium and/or the gaseous medium, the orientation of the hole or barrier, and/or a membrane defining the boundary, is arranged to control the separation of the non-gaseous medium from the gaseous medium at the boundary in the hole, and wherein the incidence of the shockwave on the boundary, thereby forms a transverse jet on the other side of the hole which is incident upon a target surface which is spaced from the barrier in the gaseous medium.

25. An apparatus for producing a localised concentration of energy comprising:
  a gaseous medium;
  a non-gaseous medium separated from the gaseous medium by a barrier comprising at least one hole therein;
  a target surface comprising a depression which is spaced from the barrier in the gaseous medium; and
  an explosive arrangement for creating at least one shockwave propagating through said non-gaseous medium so as to be incident upon a boundary formed by said hole, wherein one or more of the viscosity, the chemical composition and the pressure of the non-gaseous medium and/or the gaseous medium, the orientation of the hole or barrier, and/or a membrane defining the boundary, is arranged to control the separation of the non-gaseous medium from the gaseous medium at the boundary in the hole, and wherein the incidence of the shockwave on the boundary thereby forms a transverse jet on the other side of the hole.

26. An apparatus for producing a localised concentration of energy comprising:
  a gaseous medium;
  a non-gaseous medium separated from the gaseous medium by a barrier comprising at least one hole therein which forms a boundary which is convex in the non-gaseous medium;
  a target surface which is spaced from the barrier in the gaseous medium; and an explosive arrangement for creating at least one shockwave propagating through said non-gaseous medium so as to be incident upon the boundary formed by said hole, wherein one or more of the viscosity, the chemical composition and the pressure of the non-gaseous medium and/or the gaseous medium, the orientation of the hole or barrier, and/or a membrane defining the boundary, is arranged to control the separation of the non-gaseous medium from the gaseous medium at the boundary in the hole, and wherein the incidence of the shockwave on the boundary thereby forms a transverse jet on the other side of the hole.

\* \* \* \* \*